(12) United States Patent
Lal et al.

(10) Patent No.: US 10,747,885 B2
(45) Date of Patent: Aug. 18, 2020

(54) TECHNOLOGIES FOR PRE-BOOT BIOMETRIC AUTHENTICATION

(71) Applicant: Intel Corporation, Santa Clara, CA (US)

(72) Inventors: Reshma Lal, Hillsboro, OR (US); Rick Edgecombe, Portland, OR (US)

(73) Assignee: Intel Corporation, Santa Clara, CA (US)

(*) Notice: Subject to any disclaimer, the term of this patent is extended or adjusted under 35 U.S.C. 154(b) by 202 days.

(21) Appl. No.: 15/870,366

(22) Filed: Jan. 12, 2018

(65) Prior Publication Data

US 2019/0042756 A1 Feb. 7, 2019

(51) Int. Cl.
*G06F 21/57* (2013.01)
*G06F 21/32* (2013.01)
*H04L 9/08* (2006.01)
*G06F 9/445* (2018.01)
*G06F 21/44* (2013.01)
(Continued)

(52) U.S. Cl.
CPC ............ *G06F 21/575* (2013.01); *G06F 9/445* (2013.01); *G06F 21/32* (2013.01); *G06F 21/44* (2013.01); *G06F 21/53* (2013.01); *G06F 21/72* (2013.01); *H04L 9/085* (2013.01); *H04L 9/0897* (2013.01); *H04L 9/3231* (2013.01); *H04L 9/3234* (2013.01); *H04L 9/3273* (2013.01); *G06F 2221/2149* (2013.01)

(58) Field of Classification Search
CPC .......... G06F 21/32; G06F 21/44; G06F 21/53; G06F 21/575; G06F 21/72; G06F 2221/2149; G06F 9/445; G06F 21/57; G06F 21/572; H04L 9/085; H04L 9/0897; H04L 9/3231; H04L 9/3234; H04L 9/3273; H04L 63/0861
See application file for complete search history.

(56) References Cited

U.S. PATENT DOCUMENTS

2009/0204964 A1* 8/2009 Foley ...................... G06F 21/53
718/1
2013/0159690 A1* 6/2013 Tsukamoto ............... G06F 1/26
713/2

(Continued)

*Primary Examiner* — Trang T Doan
(74) *Attorney, Agent, or Firm* — Barnes & Thornburg LLP

(57) ABSTRACT

A method of providing authentication services for a hardware component within a secure execution environment during a pre-boot process is provided. The method is implemented using a computing device. The method includes loading, within the secure execution environment, a biometric authentication enclave, the secure execution environment being isolated from untrusted software of the computing device and receiving, by a manageability controller, a biometric template from a network source. The method also includes mutually authenticating the manageability controller and the biometric authentication enclave, and provisioning, to the biometric authentication enclave, from the manageability controller, the biometric template in response to mutual authentication. The method further includes authenticating, by the biometric authentication enclave, a biometric input using the biometric template. The method may further include providing access to a hardware component in response to authenticating the biometric input.

25 Claims, 6 Drawing Sheets

(51) Int. Cl.
*G06F 21/53* (2013.01)
*G06F 21/72* (2013.01)
*H04L 9/32* (2006.01)

(56) References Cited

U.S. PATENT DOCUMENTS

| | | | |
|---|---|---|---|
| 2015/0256332 A1* | 9/2015 | Raj | H04L 63/0428 |
| | | | 713/150 |
| 2016/0173493 A1* | 6/2016 | Wane | H04W 4/50 |
| | | | 380/249 |
| 2017/0344407 A1* | 11/2017 | Jeon | G06F 9/545 |
| 2018/0007040 A1* | 1/2018 | Thom | G06F 21/575 |
| 2019/0123907 A1* | 4/2019 | Kim | G06K 9/00087 |

* cited by examiner

TECHNOLOGIES FOR PRE-BOOT BIOMETRIC AUTHENTICATION

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. This I/O data may include authentication data. For example, an I/O device may provide authentication data (e.g., usernames, passwords, biometric data, or the like). In the case of biometric data, a biometric I/O device may provide, for example, a fingerprint image for a user that is compared to a biometric template that includes a stored fingerprint image or other biometric data for that user to authenticate the user. Such biometric data and biometric templates are sensitive and personally identifiable data that may be susceptible to intrusions or attacks by unauthorized individuals looking to authenticate as the authorized user. For example, unauthorized individuals may wish to access an encrypted component (e.g., an encrypted hard drive) using authentication credentials or data received by unauthorized means.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
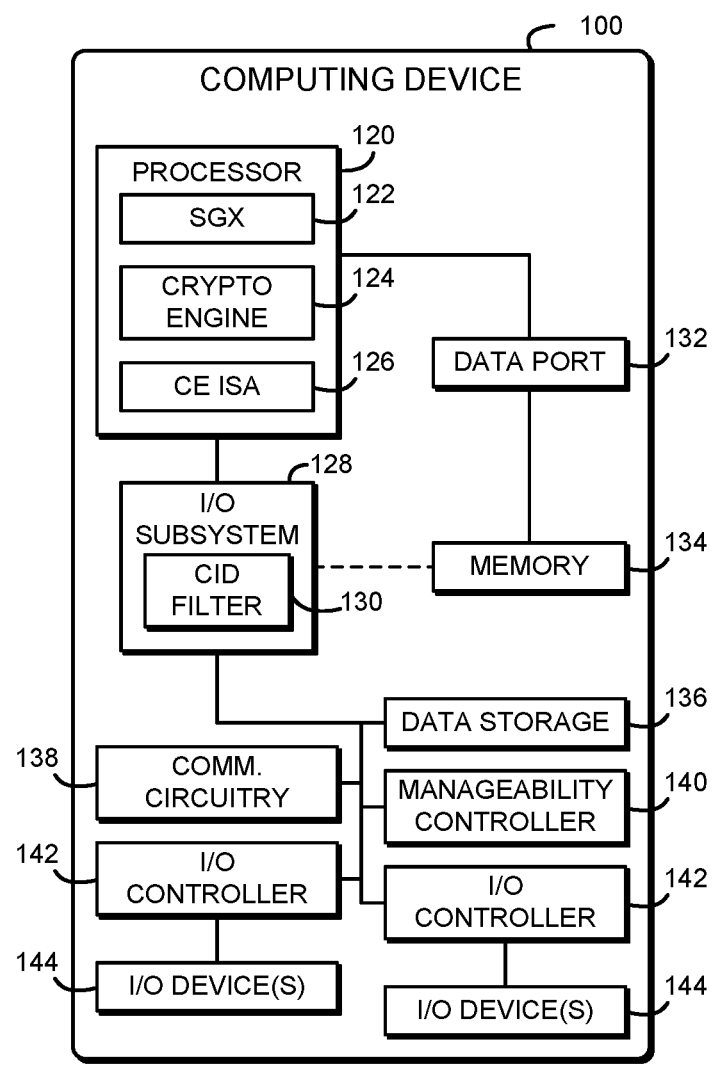
FIG. 1 is a simplified block diagram of at least one embodiment of a computing device for pre-boot biometric authentication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for pre-boot biometric authentication is shown. In use, as described further below, the computing device 100 generates a secure execution environment that enables pre-boot biometric authentication using a biometric template that is received from a network source. The secure execution environment is isolated from untrusted software. As used herein, untrusted software includes any software or application outside of the trusted code base of the computing device 100, such as the operating system of the computing device 100 or a pre-boot firmware environment of the computing device 100. At pre-boot time, untrusted software may be an entry point or attack surface that could be used to access biometric authentication data.

Within a pre-boot process, the computing device 100 loads the secure execution environment. More specifically, the computing device 100 loads a minimal or otherwise lightweight firmware application. The firmware application initiates the secure execution environment that can then be used to host a biometric authentication enclave. The computing device 100 receives a biometric template from a network source, which may be communicatively coupled to a manageability controller or other co-processor of the computing device 100. The manageability controller receives the biometric template from the network source and, once the authentication enclave has been prepared, securely provisions the biometric template to a processor of the computing device 100. The firmware biometric authentication enclave authenticates a biometric input (e.g., received from a biometric I/O device) by comparing it to the biometric template. If the biometric input is validated, the biometric authentication enclave approves the access dependent on the biometric authentication. For example, the biometric authentication may be initiated by a user to gain access to a hardware component, such as an encrypted data storage device (e.g., whole-drive encrypted hard drive). Once access is granted, the pre-boot process may complete and continue boot of the computing device 100 or another computing device.

Some known systems are limited in their ability to protect biometric data or to use biometric data for hardware encryption. The disclosed embodiments provide several advantages over these known systems. For example, the illustrative embodiment provides secure storage of biometric data at rest. More specifically, at pre-boot time, biometric data can be securely provisioned to a biometric authentication enclave (e.g., through a secure channel that is inaccessible to untrusted software). Once the biometric data is provisioned, the biometric authentication enclave can use the biometric data to authenticate a user. While the biometric data is not being used for authentication, it may be stored securely by the manageability controller of the computing device 100. As a result, the biometric data can be stored securely without the biometric data ever being accessible by untrusted software. For example, an operating system of the computing device 100 may be considered untrusted software. As a result, an attacker cannot use the operating system (e.g., using a virus, bootkit, rootkit, or any other program that would load with the operating system on or after boot) as an entry point to access the biometric data.

Moreover, the illustrative embodiments also allow for whole-disk encryption. Since the biometric authentication enclave performs biometric authentication before the computing device 100 has booted up, the whole disk (for example, including the master boot record) may be encrypted and later decrypted at pre-boot time. The illustrative embodiments obviate the need for an unencrypted volume or a separate secure operating system from which a computing device is securely booted to prevent pre-boot attacks. In addition, the illustrative embodiments also serve to remove BIOS code from the Trusted Computing Base (TCB) of the computing device 100. BIOS code, like operating system code mentioned above, may also be susceptible to being attacked or compromised by an unscrupulous user. Thus, in the illustrative embodiment, because BIOS code is not part of the TCB, the BIOS code may not be available to be used for intrusions into the computing device 100 (e.g., for the purpose of stealing biometric data).

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a channel identifier (CID) filter 130, a memory 134, a data storage device 136, and one or more I/O controllers 142. Additionally, in some embodiments, one or more of the illustrative components may be incorporated in, or otherwise form a portion of, another component. For example, the memory 134, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 134. The secure enclave support 122 may be embodied as a set of processor instruction extensions that allows the processor 120 to establish one or more secure enclaves in the memory 134. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting biometric templates received from manageability controller 140. In particular, as described further below, in some embodiments, biometric templates may be stored in a TIO Processor Reserved Memory (TIO PRM) region that is not accessible to software of the computing device 100, and the cryptographic engine 124 may be used to encrypt the biometric templates and later provision it to a biometric authentication application. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 130, described further below. For example, the cryptographic engine ISA 126 may include a processor instruction to bind programming instructions or other data to the cryptographic engine 124, the CID filter 130, an I/O controller 142, and/or other components of the computing device 100, a processor instruction to unwrap the bound programming instructions and provide them to the target component over a sideband network or other secure fabric of the computing device 100, a processor instruction to securely copy and encrypt data from the TIO PRM region to an unprotected memory buffer, and/or other processor features.

The memory 134 may be embodied as any type of volatile or non-volatile memory or data storage capable of performing the functions described herein. In operation, the memory 134 may store various data and software used during operation of the computing device 100 such as operating systems, applications, programs, libraries, and drivers. As described further below, the memory 134 may also include the TIO PRM region. The memory 134 is illustratively connected with a data port 132 to send and receive data from the processor 120 and the I/O subsystem 128. Additionally or alternatively, the memory 134 may be communicatively coupled to the processor 120 via the I/O subsystem 128, which may be embodied as circuitry and/or components to facilitate input/output operations with the processor 120, the memory 134, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 134 may be directly coupled to the processor 120, for example via an integrated memory controller hub. The I/O subsystem 128 may further include a sideband network, secure fabric, or other secure routing support. The secure routing support may include hardware support to ensure I/O data cannot be misrouted in the I/O subsystem 128 under the influence of rogue software. The secure routing support may be used with the CID filter 130 to provide cryptographic protection of I/O data. Additionally, in some embodiments, the I/O subsystem 128 may form a portion of a system-on-a-chip (SoC) and be incorporated, along with the processor 120, the memory 134, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 134.

The data storage device 136 may be embodied as any type of device or devices configured for short-term or long-term storage of data such as, for example, memory devices and circuits, memory cards, hard disk drives, solid-state drives, non-volatile flash memory, or other data storage devices. As described further below, the data storage device 136 may be used to store sealed binding identities or other data that may be accessed by secure enclaves of the computing device 100. The computing device 100 may also include a communications subsystem 138, which may be embodied as any communication circuit, device, or collection thereof, capable of enabling communications between the computing device 100 and other remote devices over a computer network (not shown). The communications subsystem 138 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 130 may be embodied as any hardware component, functional block, logic, or other circuit that performs channel identifier (CID) filtering function(s), including filtering I/O transactions based on CIDs inserted by the I/O controllers 142. For example, the CID filter 130 may observe DMA transactions inline, perform test(s) based on the CID and memory address included in the transaction, and drop transactions that fail the test(s). In the illustrative embodiment, the CID filter 130 is incorporated in the I/O subsystem 128. In other embodiments, the CID filter 130 may be included in one or more other components and/or in a SoC with the processor 120 and I/O subsystem 128 as a separate component.

As shown, the computing device 100 further includes a manageability controller 140. The manageability controller 140 may be embodied as any hardware component(s) or circuitry capable of providing manageability and security-related services to the computing device 100. In particular, the manageability controller 140 may include a microprocessor, microcontroller, or other embedded controller capable of executing firmware and/or other code independently and securely from the processor 120. Thus, the manageability controller 140 may be used to establish a trusted execution environment for the computing device 100. The manageability controller 140 may communicate with the processor 120 and/or other components of the computing device 100 over a dedicated bus, such as a host embedded controller interface (HECI). The manageability controller 140 may also provide remote configuration, control, or management of the computing device 100. Illustratively, the manageability controller 140 is incorporated in a system-on-a-chip (SoC) of the computing device 100; however, in some embodiments, the computing device 100 may include one or more additional components capable of establishing a trusted execution environment, such as a security engine, an out-of-band processor, a Trusted Platform Module (TPM), and/or another security engine device or collection of devices.

In the illustrative embodiment, the manageability controller 140 may be embodied as a co-processor for the computing device 100. In other words, the manageability controller 140 performs additional or auxiliary processing for the computing device in addition to mainline processing performed by, for example, the processor 120 (shown in FIG. 1). The manageability controller 140 may be operating even when the processor 120 or the computing device 100 as a whole is in what are sometimes termed "S0ix" states state (or "sleep mode") or other low-power state. In the illustrative embodiment, the manageability controller 140 is configured to operate independently of the processor 120.

Each of the I/O controllers 142 may be embodied as any biometric I/O device controller, embedded controller, microcontroller, microprocessor, functional block, logic, or other circuit or collection of circuits capable of performing the functions described herein. In some embodiments, one or more of the I/O controllers 142 may be embedded in another component of the computing device 100 such as the I/O subsystem 128 and/or the processor 120. Additionally or alternatively, one or more of the I/O controllers 142 may be connected to the I/O subsystem 128 and/or the processor 120 via an expansion bus such as PCI Express (PCIe) or other I/O connection. As described above, the I/O controllers 142 communicate with one or more I/O devices 144, for example over a peripheral communications bus (e.g., USB, Bluetooth, etc.). The I/O devices 144 may be embodied as any I/O device, such as USB devices, human interface devices, fingerprint readers, facial feature mappers, retinal scanners, or other biometric devices, keyboards, mice, touch screens, microphones, cameras, and other input devices, as well as displays and other output devices. The I/O controllers 142 and associated DMA channels may be uniquely identified using identifiers called channel identifiers (CIDs). Each I/O controller 142 may assert an appropriate CID with every trusted I/O DMA transaction, for example as part of a transaction layer packet (TLP) prefix, to uniquely identify the source of the DMA transaction and provide liveness protections. The CID also enables the isolation of I/O from different devices 144.

Figure 2:
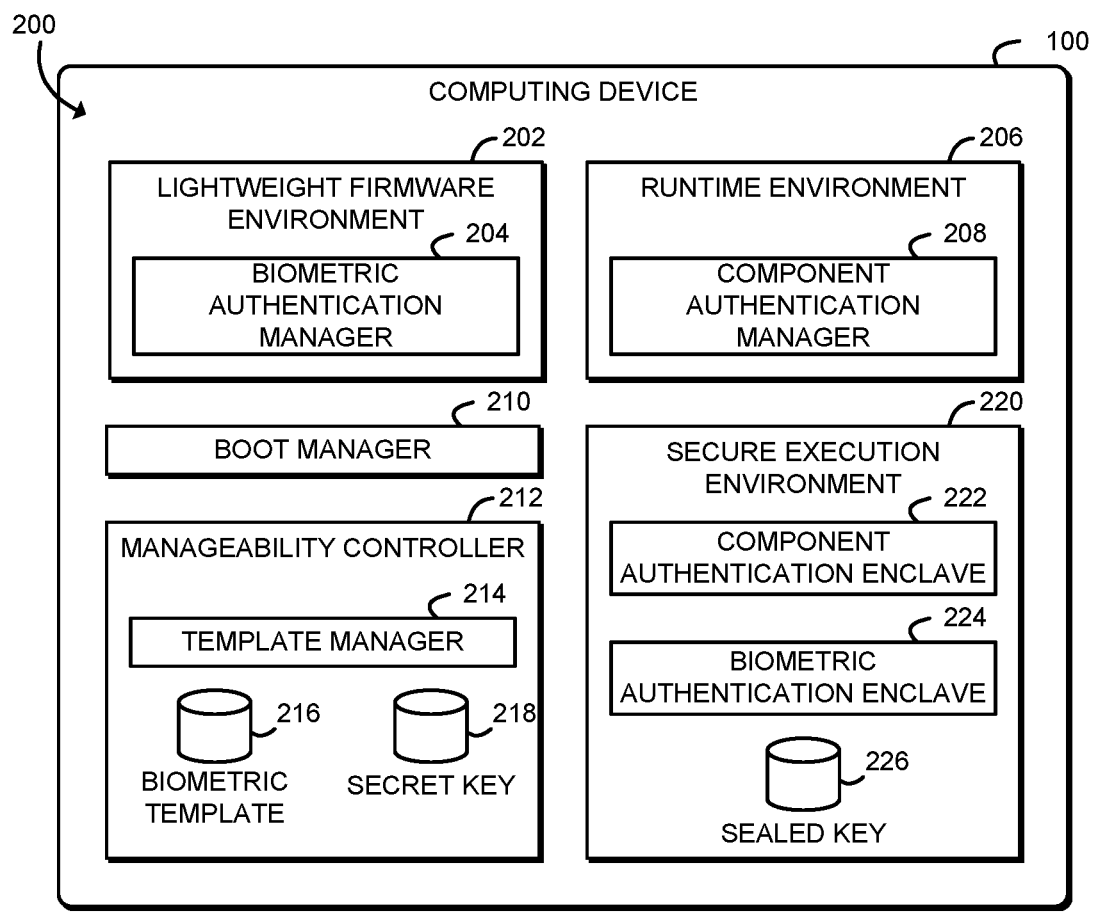
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a lightweight firmware environment 202, a runtime environment 206, a boot manager 210, a manageability controller 212, and a secure execution environment 220. The lightweight firmware environment 202 includes a biometric authentication manager 204, the runtime environment 206 includes a component authentication manager 208, the manageability controller 212 includes a template manager 214, and the secure execution environment 220 includes a component authentication enclave 222 and a biometric authentication enclave 224. The various components of the environment 200 may be embodied as hardware, firmware, software, or a combination thereof. As such, in some embodiments, one or more of the components of the environment 200 may be embodied as circuitry or collection of electrical devices (e.g., biometric authentication manager circuitry 204, component authentication manager circuitry 208, boot manager circuitry 210, template manager circuitry 214, component authentication enclave circuitry 222, and/or biometric authentication enclave circuitry 224). It should be appreciated that, in such embodiments, one or more of the biometric authentication manager circuitry 204, the component authentication manager circuitry 208, the boot manager circuitry 210, the template manager circuitry 214, the component authentication enclave circuitry 222, and/or the biometric authentication enclave circuitry 224 may form a portion of the processor 120, the I/O subsystem 128, the manageability controller 140, and/or other components of the computing device 100. Additionally, in some embodiments, one or more of the illustrative components may form a portion of another component and/or one or more of the illustrative components may be independent of one another.

The manageability controller 212 may be embodied as the manageability controller 140 or other co-processor capable of operating independently of the processor 120, including operating before an operating system or other runtime environment is loaded. The template manager 214 is configured to receive biometric template data 216 from a network source. The biometric template data 216 may include, for example, a fingerprint image, retina scan, face scan, genetic material sample, iris scan, voice sample, or the like, or some combination of the above. The biometric template data 216 may be received from a network source such as an enterprise administrator. For example, biometric template data 216 for a new user may be provided to allow access to an electronic resource such as the computing device 100. The biometric template data 216 may be received by the manageability controller 212 using an out-of-band network interface.

The component authentication manager 208 is configured to mutually authenticate the manageability controller 212 and the secure execution environment 220. The secure execution environment 220 is an execution environment that is isolated from untrusted software of the computing device, such as the pre-boot firmware environment, operating system, or hypervisor. Mutually authenticating the manageability controller 212 and the secure execution environment 220 may include securely exchanging a shared secret key 218 between the manageability controller 212 and the secure execution environment 220 (or a component of the secure execution environment such as the component authentication enclave 222). Mutually authenticating the manageability controller 212 and the secure execution environment 220 may further include securely storing the shared secret key 218 by the manageability controller 212 and the secure execution environment 220. Securely storing the shared secret key 218 may include storing the secret key 218 in an internal storage of the manageability controller 212 and/or sealing the secret key 218 with an identity of the secure execution environment 220 to generate a sealed key 226. Mutually authenticating the manageability controller 212 and the secure execution environment 220 may include verifying an identity of the secure execution environment 220, such as a signing identity of an authority of the secure execution environment 220, and/or verifying locality of the manageability controller 212. Mutual authentication may also include verifying a certificate of the secure execution environment 220 and/or the manageability controller 212 using a remote verification service.

The biometric authentication manager 204 is configured to securely provision the biometric template data 216 from the manageability controller 212 to the secure execution environment 220 in response to mutually authenticating the manageability controller 212 and the secure execution environment 220. Securely provisioning the biometric template data 216 may include integrity-, privacy-, or otherwise protecting the biometric template data 216 with the shared secret key 218. Securely provisioning the biometric template data 216 may include unsealing, by the secure execution environment 220, the sealed key 226 using the identity of the secure execution environment 220 to recover the shared secret key 218. The biometric authentication manager 204 is further configured to perform, with the secure execution environment 220, a biometric authentication operation on a biometric input using the biometric template data 216 during a pre-boot process. The biometric authentication manager 204 may be further configured to provide access to a hardware component of the computing device 100 such as an encrypted data storage device in response to performing the biometric authentication operation.

The boot manager 210 is configured to load the runtime environment 206 and to load the component authentication enclave 222 within the runtime environment 206 using the secure enclave support 122 of the processor 120. Mutual authentication may be performed between the manageability controller 212 and the component authentication enclave 222. The boot manager 210 is further configured to load the lightweight firmware environment 202 during the pre-boot process and to load the biometric authentication enclave 224 within the lightweight firmware environment 202 using the secure enclave support 122 of the processor 120. The biometric template data 216 may be provisioned from the manageability controller 212 to the biometric authentication enclave 224. The biometric authentication enclave 224 may perform the biometric authentication operation.

The lightweight firmware environment 202 may be embodied as a pre-boot platform firmware environment of the computing device 100, such as a Unified Extensible Firmware Interface (UEFI) firmware environment, Basic Input/Output System (BIOS) firmware environment, or other firmware environment. The runtime environment 206 may be embodied as an operating system, hypervisor, or other run-time control structure of the computing device 100. The runtime environment 206 may provide a full operating environment for the computing device 100, including in-band network access to remote hosts.

The authentication enclaves 222, 224 are each trusted execution environments of the computing device 100 that are authenticated and protected from unauthorized access using hardware support of the computing device 100, such as the secure enclave support 122 of the processor 120. Illustratively, each of the authentication enclaves 222, 224 is embodied as a secure enclave established using Intel SGX technology. Each of the authentication enclaves 222, 224 may be cryptographically signed by an authority such as a device manufacturer, operating system vendor, administrator, or other authority associated with the authentication enclave 222, 224. Illustratively, both authentication enclaves 222, 224 are provided by the same authority and thus, as described further below, may be associated with the same signing identity. Additionally or alternatively, although illustrated as separate authentication enclaves 222, 224, it should be understood that in some embodiments the functions of the authentication enclaves 222, 224 may be performed by a single authentication enclave.

Figure 3:
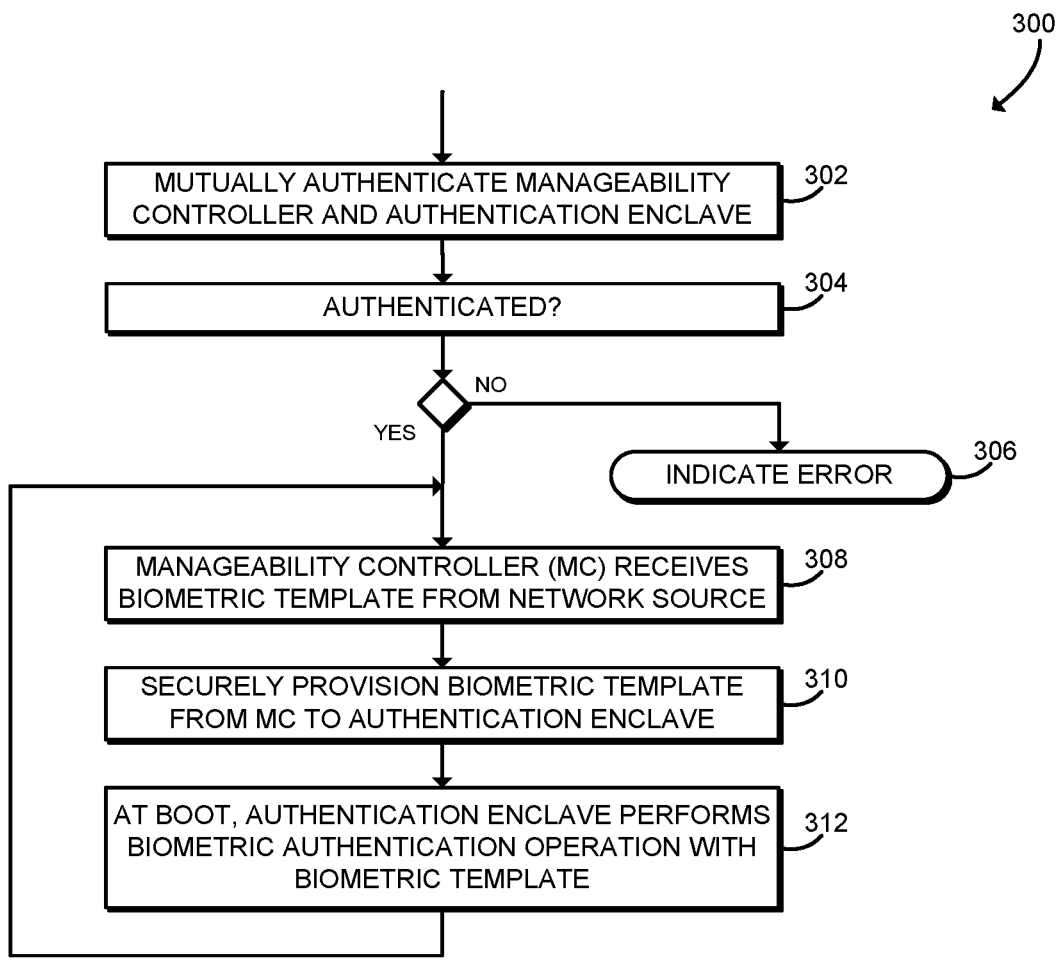
FIG. 3 is a simplified flow diagram of at least one embodiment of a method for secure pre-boot biometric authentication that may be executed by the computing device of FIGS. 1-2.

Referring now to FIG. 3, in use, the computing device 100 may execute a method 300 for secure pre-boot biometric authentication. It should be appreciated that, in some embodiments, the operations of the method 300 may be performed by one or more components of the environment 200 of the computing device 100 as shown in FIG. The method 300 begins in block 302, in which the computing device 100 mutually authenticates the manageability controller 212 and the component authentication enclave 222 of the secure execution environment 220. As described further below, the mutual authentication may be performed within the runtime environment 206 of the computing device 100 and thus may access a remote authentication service or otherwise take advantage of runtime resources of the computing device 100. In the illustrative embodiment, the computing device 100 authenticates the component authentication enclave 222, and because the authentication enclaves 222, 224 are provided by the same authority (e.g., platform owner, software vendor, manufacturer, etc.), the authentication also applies to the biometric authentication enclave 224. Additionally or alternatively, in some embodiments the computing device 100 may authenticate the biometric authentication enclave 224 directly. Potential embodiments of methods for mutual authentication that may be executed by the manageability controller 212 and the component authentication enclave 222 are described further below in connection with FIGS. 4 and 5.

In block 304, the computing device 100 determines whether the manageability controller 212 and the component authentication enclave 222 were successfully authenticated. If not, the method 300 branches to block 306, in which the computing device 100 indicates an error. For example, the computing device 100 may display an error message to a user or otherwise indicate that secure biometric authentication is not available. In some embodiments, the computing device 100 may halt operation or otherwise prohibit access to the computing device 100. Referring back to block 304, if the manageability controller 212 and the component authentication enclave 222 were successfully authenticated, the method 300 advances to block 308.

In block 308, the manageability controller 212 receives biometric template data 216 from a remote source, such as an enterprise administrator or other remote network source. One potential embodiment of a method for receiving biometric data is described further below in connection with FIG. 4.

In block 310, the computing device 100 securely provisions the biometric template data 216 from the manageability controller 212 to the biometric authentication enclave 224. As described further below, the biometric template data 216 may be integrity- and privacy-protected such that only the authentic biometric authentication enclave 224 may access the biometric template data 216. Potential embodiments of methods for securely provisioning the biometric template data 216 that may be executed by the manageability controller 212 and the biometric authentication enclave 224 are described further below in connection with FIGS. 4 and 6.

In block 312, the biometric authentication enclave 224 performs a biometric authentication operation using the biometric template data 216. The biometric authentication enclave 224 performs the biometric authentication operation during the boot process of the computing device 100, for example within the lightweight firmware environment 202. One potential embodiment of a method for performing the biometric authentication operation is described further below in connection with FIG. 6. As shown, after performing the biometric authentication operation, the method 300 loops back to block 308 to continue provisioning biometric template data 216 and performing biometric authentication. Thus, the computing device 100 may perform an initial authentication of the manageability controller 212 and the component authentication enclave 222, and then continue to perform secure biometric authentication for each boot of the computing device 100.

Figure 4:
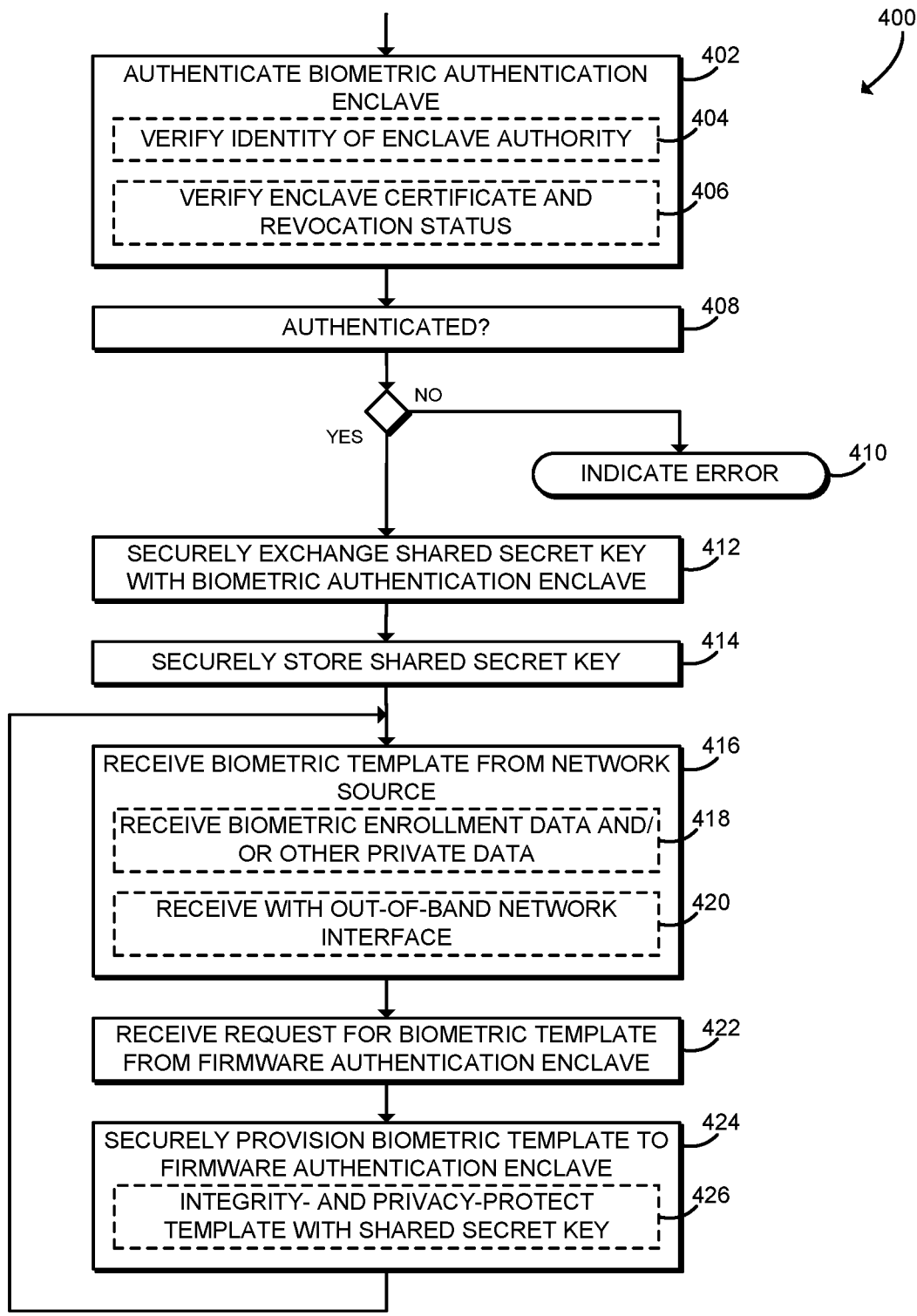
FIG. 4 is a simplified flow diagram of at least one embodiment of a method for mutual component authentication and secure provisioning of biometric templates that may be executed by the computing device of FIGS. 1-2.

Referring now to FIG. 4, in use, the computing device 100 may execute a method 400 for mutual component authentication and secure provisioning of biometric templates. It should be appreciated that, in some embodiments, the operations of the method 400 may be performed by one or more components of the environment 200 of the computing device 100 as shown in FIG. 2, such as the manageability controller 212. The method 400 begins in block 402, in which the manageability controller 212 authenticates the component authentication enclave 222. In some embodiments, in block 404 the manageability controller 212 may verify an identity of the component authentication enclave 222. For example, the computing device 100 may verify one or more identities of the component authentication enclave 222 such as a signing identity of an authority associated with the enclave and/or an enclave identity. The authentication enclaves 222, 224 may be provided by the same authority and thus may share the same identity (e.g., the same signing identity). Accordingly, authentication of the component authentication enclave 222 may also server as authentication of the biometric authentication enclave 224. In some embodiments, in block 406 the manageability controller 212 may verify a certificate associated with the component authentication enclave 222. For example, the manageability controller 212 may access a remote certificate verification service to verify the revocation status of the certificate.

In block 408, the manageability controller 212 determines whether the component authentication enclave 222 was successfully authenticated. If not, the method 400 branches to block 410, in which the computing device 100 indicates an error. For example, the computing device 100 may halt operation or otherwise prohibit access to the computing device 100. Referring back to block 408, if the component authentication enclave 222 was successfully authenticated, the method 400 advances to block 412.

In block 412, the manageability controller 212 securely exchanges a shared secret key 218 with the component authentication enclave 222. For example, the manageability controller 212 may perform the SIGMA key exchange protocol, or any other appropriate cryptographic key exchange protocol to exchange the secret key 218. The secret key 218 may be known only to the manageability controller 212 and the authentication enclaves 222, 224 and thus may indicate successful mutual authentication.

In block 414, the manageability controller 212 securely stores the shared secret key 218. The shared secret key 218 may be stored in an internal, tamper-proof storage of the manageability controller 212 (e.g., flash memory or other persistent storage). The shared secret key 218 is thus protected at rest from access by untrusted software.

In block 416, the manageability controller 212 receives the biometric template data 216 from a network source. For example, the biometric template data 216 may be received from an enterprise administrator or other remote computing device. The biometric template data 216 may be received using any secure network protocol, management interface, or other secure interface. In some embodiments, in block 418 the manageability controller 212 may receive biometric enrollment data and/or other private data. For example, the computing device 100 may receive biometric data associated with a new employee going through a new hire or orientation process. The new employee may provide, for example, a fingerprint. In addition, the new employee may also provide a government identification number or other private data that is received in association with the biometric data (e.g., fingerprint). In some embodiments, in block 420 the manageability controller 212 may receive the biometric template data 216 with an out-of-band network interface. In the illustrative embodiment, the biometric template data 216 is received by the manageability controller 212 as described above with respect to FIG. 2. The biometric template data 216 may be transmitted to the manageability controller 212 by an enterprise administrator or other remote network source. More specifically, the manageability controller 212 may receive the biometric template data 216 during a pre-boot process. In other words, the manageability controller 212 may receive the biometric template data 216 when the processor 120 for the computing device 100 is inactive and/or when the operating system for the computing device 100 is not initiated.

In block 422, the manageability controller 212 receives a request for the biometric template data 216 from the biometric authentication enclave 224. As described further below in connection with FIG. 6, the biometric authentication enclave 224 may request the biometric template data 216 during a boot process of the computing device 100.

In block 424, the manageability controller 212 securely provisions the biometric template data 216 to the biometric authentication enclave 224. The manageability controller 212 may use any technique that is protected from untrusted software, hardware, or other components of the computing device 100 to securely send the biometric template data 216 to the biometric authentication enclave 224. In some embodiments, in block 426, the manageability controller 212 may integrity- and privacy-protect the biometric template data 216 with the secret key 218. Protecting the biometric template data 216 with the secret key 218 ensures that only authenticated entities in possession of the secret key 218 (e.g., the authentication enclaves 222, 224 and/or other enclaves associated with the same authority) may access the biometric template data 216. Thus, as part of securely provisioning the biometric template data 216, the manageability controller 212 may also verify the authenticity of the biometric authentication enclave 224. After securely provisioning the biometric template data 216, the method 400 loops back to block 416 to continue receiving and provisioning biometric template data 216.

Figure 5:
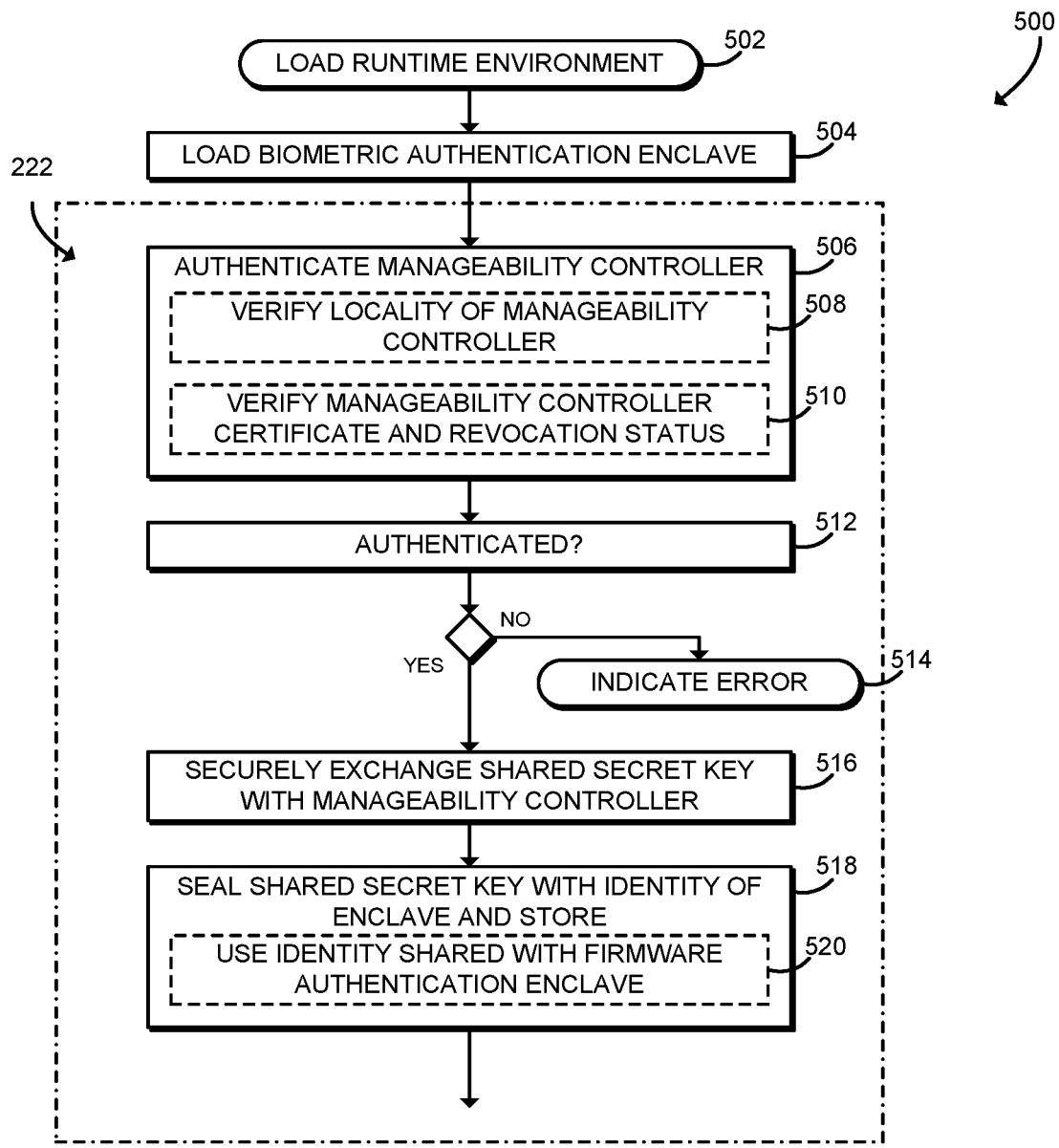
FIG. 5 is a simplified flow diagram of at least one embodiment of a method for mutual component authentication that may be executed by the computing device of FIGS. 1-2.

Referring now to FIG. 5, in use, the computing device 100 may execute a method 500 for mutual component authentication. It should be appreciated that, in some embodiments, the operations of the method 500 may be performed by one or more components of the environment 200 of the computing device 100 as shown in FIG. 2, such as the runtime environment 206. The method 500 begins in block 502, in which the computing device 100 loads the runtime environment 206. The runtime environment 206 may be loaded, for example, after completion of a boot process of the computing device 100. Loading the runtime environment 206 may include executing an operating system or otherwise executing the computing device 100 in a fully operational state.

In block 504, the computing device 100 loads the component authentication enclave 222. The computing device 100 may load the component authentication enclave 222 using the secure enclave support 122 of the processor 120. Loading the component authentication enclave 222 may verify, authenticate, or otherwise ensure that the component authentication enclave 222 was provided by an identified authority and has not been tampered with. For example, the processor 120 may measure the code and/or data of the component authentication enclave 222 as it is loaded into the memory 134 and verify that measurement. Additionally, the component authentication enclave 222 may be cryptographically signed by an authority that provided the component authentication enclave 222, such as a device manufacturer, operating system vendor, system administrator, or other authority. After being successfully loaded and verified, the biometric authentication enclave 224 may be trusted by the computing device 100. As shown in FIG. 5, execution of the method 500 proceeds to enter the component authentication enclave 222.

In block 506, the component authentication enclave 222 authenticates the manageability controller 212. In some embodiments, in block 508 the component authentication enclave 222 may verify locality of the manageability controller 212; that is, the component authentication enclave 222 may verify that the manageability controller 212 is a co-processor of the local platform (e.g., the manageability controller 140). In some embodiments, in block 510 the component authentication enclave 222 may verify a certificate of the manageability controller 212. For example, the component authentication enclave 222 may access a remote certificate verification service to verify the revocation status of the certificate.

In block 512, the component authentication enclave 222 determines whether the manageability controller 212 was successfully authenticated. If not, the method 500 branches to block 514, in which the computing device 100 indicates an error. For example, the computing device 100 may halt operation or otherwise prohibit access to the computing device 100. Referring back to block 512, if the manageability controller 212 was successfully authenticated, the method 500 advances to block 516.

In block 516, the component authentication enclave 222 securely exchanges a shared secret key 218 with the manageability controller 212. For example, as described above, the component authentication enclave 222 may perform the SIGMA key exchange protocol, or any other appropriate cryptographic key exchange protocol to exchange the secret key 218. As described above, the secret key 218 may be known only to the manageability controller 212 and the authentication enclaves 222, 224 and thus may indicate successful mutual authentication.

In block 518, the component authentication enclave 222 seals the shared secret key 218 and stores the sealed key 226. Sealing the shared secret key 218 encrypts the shared secret key 218 to generate the sealed key 226 and stores the sealed key 226 in a location accessible by the authentication enclaves 222, 224 (e.g., the data storage device 136). Thus, the sealed key 226 is encrypted at rest. The sealed key 226 is encrypted with an encryption key that is accessible to both the component authentication enclave 222 and the biometric authentication enclave 224. In some embodiments, in block 520, the component authentication enclave 222 may seal the secret key 218 using an identity shared with both the component authentication enclave 222 and the biometric authentication enclave 224. For example, the secret key 218 may be sealed using the signing identity of an authority of the component authentication enclave 222. The authority may be, for example, a device manufacturer, operating system vendor, administrator, or other authority associated with the component authentication enclave 222. For example, a hash of the public key of the authority for the component authentication enclave 222 may be stored in the MRSIGNER register, and the processor 120 may generate the encryption key as a function of the MRSIGNER register. The biometric authentication enclave 224 may be signed and/or otherwise provided by the same authority and thus may have the same signing identity. After storing the sealed key 226, the method 500 is completed. Upon subsequent boot events, the computing device 100 may perform secure pre-boot biometric authentication as described below in connection with FIG. 6.

Figure 6:
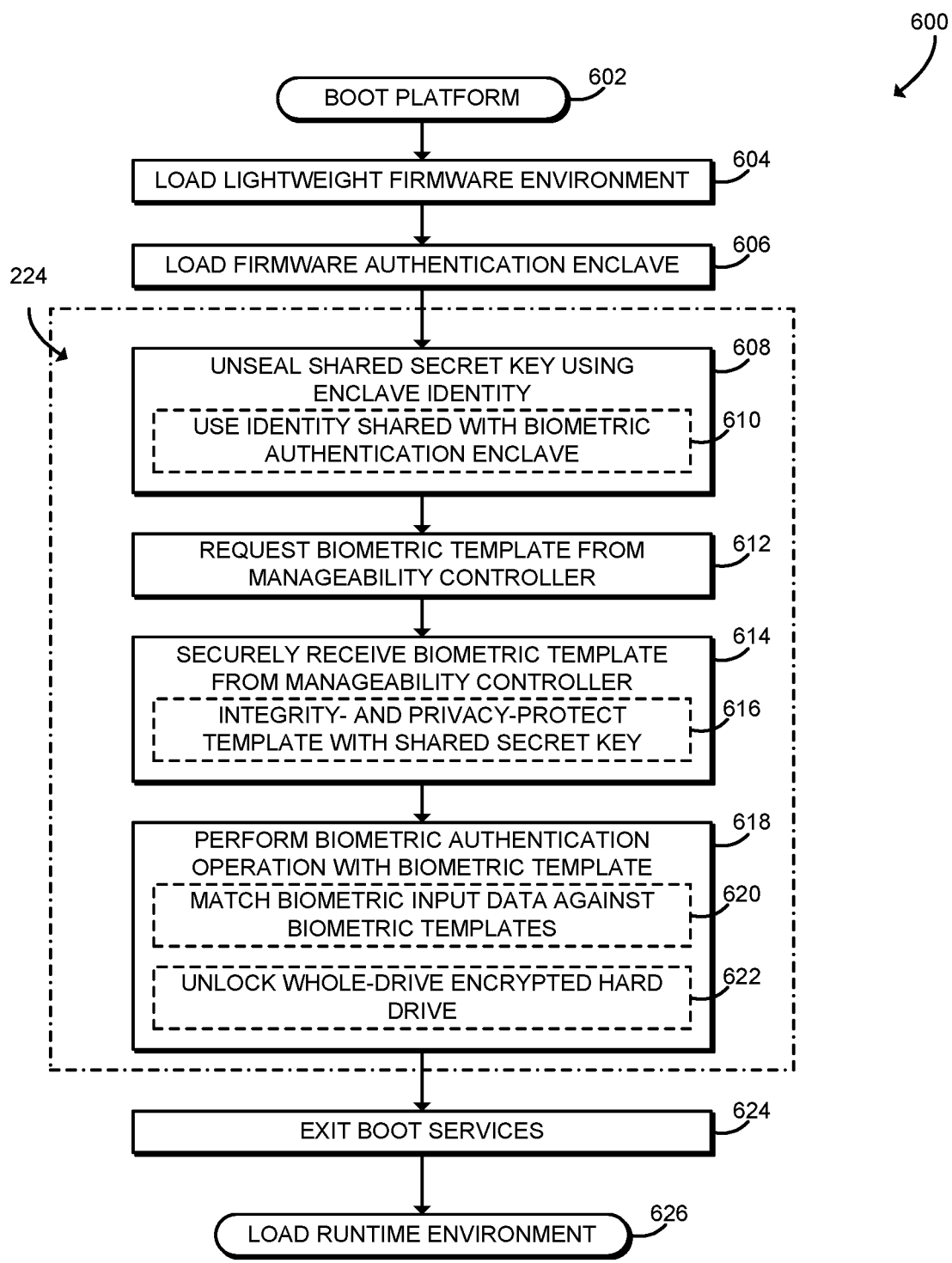
FIG. 6 is a simplified flow diagram of at least one embodiment of a method for secure pre-boot biometric authentication that may be executed by the computing device of FIGS. 1-2.

Referring now to FIG. 6, in use, the computing device 100 may execute a method 600 for secure pre-boot biometric authentication. It should be appreciated that, in some embodiments, the operations of the method 600 may be performed by one or more components of the environment 200 of the computing device 100 as shown in FIG. 2, such as the lightweight firmware environment 202. The method 600 begins in block 602, in which the computing device 100 boots. The computing device 100 may start the boot process, for example, in response to a reboot, power cycle, or other reset of the computing device 100. In response to booting, the computing device 100, in block 604, loads the lightweight firmware environment 202. As described above in connection with FIG. 2, the lightweight firmware environment 202 may be embodied as a firmware application that includes a minimal or otherwise lightweight environment that supports execution of a secure execution environment. For example, the lightweight firmware environment 202 may provide a minimal or otherwise lightweight set of kernel services (e.g., ring level 0 services) to support a user level (e.g., ring level 3) secure execution environment. The firmware application initiates the secure execution environment that can then be used to host a biometric authentication enclave. In addition, the lightweight firmware environment 202 may configure hardware, initialize firmware execution environments (e.g., pre-UEFI environments, UEFI driver execution environments, or other firmware environments), and perform other initialization tasks.

In block 606, the computing device 100 loads the biometric authentication enclave 224 within the lightweight firmware environment 202 using the secure enclave support 122 of the processor 120. In some embodiments, the biometric authentication enclave 224 may be embodied as a lightweight enclave smaller than the component authentication enclave 222 and thus capable of executing within the relatively constrained lightweight firmware environment 202. Loading the biometric authentication enclave 224 may verify, authenticate, or otherwise ensure that the biometric authentication enclave 224 was provided by an identified authority and has not been tampered with. For example, the processor 120 may measure the code and/or data of the biometric authentication enclave 224 as it is loaded into the memory 134 and verify that measurement. Additionally, the biometric authentication enclave 224 may be cryptographically signed by an authority that provided the biometric authentication enclave 224, such as a device manufacturer, operating system vendor, system administrator, or other authority. After being successfully loaded and verified, the biometric authentication enclave 224 may be trusted by the computing device 100. As shown in FIG. 6, execution of the method 600 proceeds to enter the biometric authentication enclave 224.

In block 608, the biometric authentication enclave 224 unseals the sealed key 226 to recover the shared secret key 218. As described above in connection with FIG. 5, the sealed key 226 is stored by the component authentication enclave 222 in a location accessible by the biometric authentication enclave 224 (e.g., the data storage device 136). Unsealing the sealed key 226 decrypts the sealed key 226 to recover the original shared secret key 218. The sealed key 226 is decrypted using an encryption key that is accessible by the biometric authentication enclave 224. In some embodiments, in block 610, the biometric authentication enclave 224 may unseal the sealed key 226 using an identity shared with both the component authentication enclave 222 and the biometric authentication enclave 224. As described above, the sealed key 226 may be sealed using the signing identity of an authority of the biometric authentication enclave 224. The authority may be, for example, a device manufacturer, operating system vendor, administrator, or other authority associated with the biometric authentication enclave 224. For example, a hash of the public key of the authority for the biometric authentication enclave 224 may be stored in the MRSIGNER register, and the processor 120 may generate the encryption key as a function of the MRSIGNER register. As described above in connection with FIG. 5, the component authentication enclave 222 may be signed and/or otherwise provided by the same authority as the biometric authentication enclave 224 and thus may have used the same signing identity to seal the sealed key 226.

In block 612, the biometric authentication enclave 224 requests biometric template data 216 from the manageability controller 212. In response to the request, in block 614, the biometric authentication enclave 224 securely receives the biometric template data 216 from the manageability controller 212. The biometric authentication enclave 224 may use any technique that is protected from untrusted software, hardware, or other components of the computing device 100 to securely receive the biometric template data 216 from the manageability controller 212. In some embodiments, in block 616 the biometric template data 216 may be integrity- and privacy-protected with the secret key 218. As described above, protecting the biometric template data 216 with the secret key 218 ensures that only authenticated entities in possession of the secret key 218 (e.g., the manageability controller 212) may access the biometric template data 216. Thus, as part of securely receiving the biometric template data 216, the biometric authentication enclave 224 may also verify the authenticity of the manageability controller 212.

In block 618, biometric authentication enclave 224 performs one or more biometric authentication operations using the biometric template data 216. In some embodiments, in block 620 the biometric authentication enclave 224 may match biometric input data against one or more biometric templates. For example, the biometric authentication enclave 224 may authenticate biometric input data that is received from a biometric I/O device 144 against the biometric template data 216. The biometric I/O device 144 may include, for example, a fingerprint reader, a retina scanner, a photographic or video camera, a microphone, a tissue sample receiver, or the similar biometric devices. The biometric input data may include, for example, a user's fingerprint. This fingerprint will serve as a candidate biometric sample to be compared to the biometric template data 216. Continuing that example, the biometric authentication enclave 224 may include image processing software that compares an image or a dataset representing an image of a fingerprint provided by a user as biometric input data to a fingerprint image previously associated with the user as a biometric template data 216. The biometric input data may be protected from unauthorized access, for example using trusted I/O. For example, the biometric authentication enclave 224 may receive the biometric input data over a secure channel that is protected by trusted I/O. The CE 124, the CID filter 130, and/or secure routing support of the I/O subsystem 128 may ensure that the contents of the biometric input data are not accessible by untrusted software or hardware of the computing device 100. Additionally, although illustrated as receiving biometric input data from a single I/O device 144, in some embodiments the biometric authentication enclave 224 may perform multimodal biometrics that use multiple sensors to account for limitations with using just one biometric scheme (e.g., matching fingerprint images and iris scans to authenticate a candidate user). Thus, the biometric authentication enclave 224 may perform secure pre-boot biometric authentication.

In some embodiments, in block 622 the biometric authentication enclave 224 may unlock a whole-drive encrypted hard drive, encrypted data storage device, or other hardware component of the computing device 100 in response to successful biometric authentication. For example, in response to successful biometric authentication, the biometric authentication enclave 224 may provide an authentication confirmation (e.g., an identifier, alphanumeric string, encryption key, flag, or other data object) to the hardware component. The hardware component may unlock (e.g., allow decrypted access to data) in response to receiving the authentication confirmation. As another example, the biometric authentication enclave 224 may indicate that biometric authentication was successful, allowing the pre-boot firmware environment to continue unlocking the hardware component. Thus, by performing biometric authentication securely in the pre-boot lightweight firmware environment 202, the computing device 100 may facilitate whole-drive encryption. As shown, the computing device 100 may exit the biometric authentication enclave 224 after performing biometric authentication operations.

Upon exiting the biometric authentication enclave 224, the computing device 100 may execute one or more other pre-boot processes. In the illustrative embodiment, in block 624, the computing device 100 exits boot services and continues booting. In block 626, the computing device 100 loads the runtime environment 206. For example, the computing device 100 may initiate an operating system, hypervisor, or other control component of the computing device 100. After loading the runtime environment 206, the method 600 is completed. At runtime, the computing device 100 may authenticate the manageability controller 212 and the authentication enclaves 222, 224 as described above in connection with FIGS. 4 and 5. In response to subsequent boot events, the computing device 100 may continue to execute the method 600 to perform pre-boot biometric authentication.

It should be appreciated that, in some embodiments, the methods 300, 400, 500, and/or 600 may be embodied as various instructions stored on a computer-readable media, which may be executed by the processor 120, the I/O subsystem 128, the manageability controller 140, and/or other components of the computing device 100 to cause the computing device 100 to perform the respective method 300, 400, 500, and/or 600. The computer-readable media may be embodied as any type of media capable of being read by the computing device 100 including, but not limited to, the memory 134, the data storage device 136, firmware devices, other memory or data storage devices of the computing device 100, portable media readable by a peripheral device 144 of the computing device 100, and/or other media.

EXAMPLES

Illustrative examples of the technologies disclosed herein are provided below. An embodiment of the technologies may include any one or more, and any combination of, the examples described below.

Example 1 includes a computing device for providing authentication services during a pre-boot process, the computing device comprising: a manageability controller, wherein the manageability controller comprises a template manager to receive a biometric template from a network source; a component authentication manager to mutually authenticate the manageability controller and a secure execution environment of the computing device, wherein the secure execution environment is isolated from untrusted software of the computing device; and a biometric authentication manager to (i) securely provision the biometric template from the manageability controller to the secure execution environment in response to mutual authentication of the manageability controller and the secure execution environment, and (ii) perform, with the secure execution environment, a biometric authentication operation on a biometric input with the biometric template during the pre-boot process.

Example 2 includes the subject matter of Example 1, and wherein to mutually authenticate the manageability controller and the secure execution environment comprises to: securely exchange a shared secret key between the manageability controller and the secure execution environment; securely store the shared secret key by the manageability controller in response to secure exchange of the shared secret key; and securely store the shared secret key by the secure execution environment in response to the secure exchange of the shared secret key.

Example 3 includes the subject matter of any of Examples 1 and 2, and wherein to securely provision the biometric template from the manageability controller to the secure execution environment comprises to protect the biometric template with the shared secret key.

Example 4 includes the subject matter of any of Examples 1-3, and wherein to protect the biometric template with the shared secret key comprises to integrity protect and to privacy protect the biometric template with the shared secret key.

Example 5 includes the subject matter of any of Examples 1-4, and wherein to securely store the shared secret key by the manageability controller comprises to store the shared secret key in an internal storage of the manageability controller.

Example 6 includes the subject matter of any of Examples 1-5, and wherein to securely store the shared secret key by the secure execution environment comprises to: seal the shared secret key with an identity of the secure execution environment to generate a sealed key; and store the sealed key in a data storage device of the computing device.

Example 7 includes the subject matter of any of Examples 1-6, and wherein to securely provision the biometric template from the manageability controller to the secure execution environment further comprises to: unseal, by the secure execution environment, the sealed key with the identity of the secure execution environment to recover the shared secret key; and protect the biometric template with the shared secret key in response to unsealing of the sealed key.

Example 8 includes the subject matter of any of Examples 1-7, and wherein to mutually authenticate the manageability controller and the secure execution environment comprises to verify, by the manageability controller, an identity of the secure execution environment.

Example 9 includes the subject matter of any of Examples 1-8, and wherein the identity comprises a signing identity of an authority of the secure execution environment.

Example 10 includes the subject matter of any of Examples 1-9, and wherein to verify the identity of the secure execution environment comprises to verify a certificate of the secure execution environment with a remote verification service.

Example 11 includes the subject matter of any of Examples 1-10, and wherein to mutually authenticate the manageability controller and the secure execution environment comprises to verify, by the secure execution environment, locality of the manageability controller.

Example 12 includes the subject matter of any of Examples 1-11, and wherein to mutually authenticate the manageability controller and the secure execution environment comprises to verify, by the secure execution environment, a certificate of the manageability controller with a remote verification service.

Example 13 includes the subject matter of any of Examples 1-12, and further comprising a boot manager to: load a runtime environment of the computing device; and load a component authentication enclave within the runtime environment with secure enclave support of a processor of the computing device, wherein the secure execution environment comprises the component authentication enclave; wherein to mutually authenticate the manageability controller and the secure execution environment comprises to mutually authenticate the manageability controller and the component authentication enclave.

Example 14 includes the subject matter of any of Examples 1-13, and further comprising a boot manager to: load a lightweight firmware environment during the pre-boot process; and load a biometric authentication enclave within the lightweight firmware environment with the secure enclave support of the processor, wherein the secure execution environment comprises the biometric authentication enclave; wherein to securely provision the biometric template from the manageability controller to the secure execution environment comprises to securely provision the biometric template from the manageability controller to the biometric authentication enclave; and wherein to perform the biometric authentication operation comprises to perform the biometric authentication operation by the biometric authentication enclave.

Example 15 includes the subject matter of any of Examples 1-14, and wherein: the component authentication enclave is associated with a signing identity of an authority of the component authentication enclave; and the biometric authentication enclave is associated with the signing identity.

Example 16 includes the subject matter of any of Examples 1-15, and wherein the biometric authentication manager is further to provide access to a hardware component of the computing device in response to performance of the biometric authentication operation.

Example 17 includes the subject matter of any of Examples 1-16, and wherein the hardware component comprises an encrypted data storage device.

Example 18 includes the subject matter of any of Examples 1-17, and wherein to receive the biometric template from the network source comprises to receive the biometric template by the manageability controller with an out-of-band network interface.

Example 19 includes the subject matter of any of Examples 1-18, and wherein the manageability controller comprises a co-processor of the computing device.

Example 20 includes the subject matter of any of Examples 1-19, and wherein the untrusted software comprises at least one of a pre-boot firmware environment, an operating system, and a hypervisor.

Example 21 includes a method for providing authentication services during a pre-boot process, the method comprising: receiving, by a manageability controller of a computing device, a biometric template from a network source; mutually authenticating, by the computing device, the manageability controller and a secure execution environment of the computing device, wherein the secure execution environment is isolated from untrusted software of the computing device; securely provisioning, by the computing device, the biometric template from the manageability controller to the secure execution environment in response to mutually authenticating the manageability controller and the secure execution environment; and performing, by the computing device with the secure execution environment, a biometric authentication operation on a biometric input using the biometric template during the pre-boot process.

Example 22 includes the subject matter of Example 21, and wherein mutually authenticating the manageability controller and the secure execution environment comprises: securely exchanging a shared secret key between the manageability controller and the secure execution environment; securely storing the shared secret key by the manageability controller in response to securely exchanging the shared secret key; and securely storing the shared secret key by the secure execution environment in response to securely exchanging the shared secret key.

Example 23 includes the subject matter of any of Examples 21 and 22, and wherein securely provisioning the biometric template from the manageability controller to the secure execution environment comprises protecting the biometric template with the shared secret key.

Example 24 includes the subject matter of any of Examples 21-23, and wherein protecting the biometric template with the shared secret key comprises integrity protecting and privacy protecting the biometric template with the shared secret key.

Example 25 includes the subject matter of any of Examples 21-24, and wherein securely storing the shared secret key by the manageability controller comprises storing the shared secret key in an internal storage of the manageability controller.

Example 26 includes the subject matter of any of Examples 21-25, and wherein securely storing the shared secret key by the secure execution environment comprises: sealing the shared secret key with an identity of the secure execution environment to generate a sealed key; and storing the sealed key in a data storage device of the computing device.

Example 27 includes the subject matter of any of Examples 21-26, and wherein securely provisioning the biometric template from the manageability controller to the secure execution environment further comprises: unsealing, by the secure execution environment, the sealed key with the identity of the secure execution environment to recover the shared secret key; and protecting the biometric template with the shared secret key in response to unsealing the sealed key.

Example 28 includes the subject matter of any of Examples 21-27, and wherein mutually authenticating the manageability controller and the secure execution environment comprises verifying, by the manageability controller, an identity of the secure execution environment.

Example 29 includes the subject matter of any of Examples 21-28, and wherein the identity comprises a signing identity of an authority of the secure execution environment.

Example 30 includes the subject matter of any of Examples 21-29, and wherein verifying the identity of the secure execution environment comprises verifying a certificate of the secure execution environment with a remote verification service.

Example 31 includes the subject matter of any of Examples 21-30, and wherein mutually authenticating the manageability controller and the secure execution environment comprises verifying, by the secure execution environment, locality of the manageability controller.

Example 32 includes the subject matter of any of Examples 21-31, and wherein mutually authenticating the manageability controller and the secure execution environment comprises verifying, by the secure execution environment, a certificate of the manageability controller with a remote verification service.

Example 33 includes the subject matter of any of Examples 21-32, and further comprising: loading, by the computing device, a runtime environment of the computing device; and loading, by the computing device, a component authentication enclave within the runtime environment using secure enclave support of a processor of the computing device, wherein the secure execution environment comprises the component authentication enclave; wherein mutually authenticating the manageability controller and the secure execution environment comprises mutually authenticating the manageability controller and the component authentication enclave.

Example 34 includes the subject matter of any of Examples 21-33, and further comprising: loading, by the computing device, a lightweight firmware environment during the pre-boot process; and loading, by the computing device, a biometric authentication enclave within the lightweight firmware environment using the secure enclave support of the processor, wherein the secure execution environment comprises the biometric authentication enclave; wherein securely provisioning the biometric template from the manageability controller to the secure execution environment comprises securely provisioning the biometric template from the manageability controller to the biometric authentication enclave; and wherein performing the biometric authentication operation comprises performing the biometric authentication operation by the biometric authentication enclave.

Example 35 includes the subject matter of any of Examples 21-34, and wherein: the component authentication enclave is associated with a signing identity of an authority of the component authentication enclave; and the biometric authentication enclave is associated with the signing identity.

Example 36 includes the subject matter of any of Examples 21-35, and further comprising providing access to a hardware component of the computing device in response to performing the biometric authentication operation.

Example 37 includes the subject matter of any of Examples 21-36, and wherein the hardware component comprises an encrypted data storage device.

Example 38 includes the subject matter of any of Examples 21-37, and wherein receiving the biometric template from the network source comprises receiving the biometric template by the manageability controller using an out-of-band network interface.

Example 39 includes the subject matter of any of Examples 21-38, and wherein the manageability controller comprises a co-processor of the computing device.

Example 40 includes the subject matter of any of Examples 21-39, and wherein the untrusted software comprises at least one of a pre-boot firmware environment, an operating system, and a hypervisor.

Example 41 includes a computing device comprising: a processor; and a memory having stored therein a plurality of instructions that when executed by the processor cause the computing device to perform the method of any of Examples 21-40.

Example 42 includes one or more non-transitory, computer readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for providing authentication services during a pre-boot process, the computing device comprising: means for receiving, by a manageability controller of the computing device, a biometric template from a network source; means for mutually authenticating the manageability controller and a secure execution environment of the computing device, wherein the secure execution environment is isolated from untrusted software of the computing device; means for securely provisioning the biometric template from the manageability controller to the secure execution environment in response to mutually authenticating the manageability controller and the secure execution environment; and means for performing, by the computing device with the secure execution environment, a biometric authentication operation on a biometric input using the biometric template during the pre-boot process.

Example 45 includes the subject matter of Example 44, and wherein the means for mutually authenticating the manageability controller and the secure execution environment comprises: means for securely exchanging a shared secret key between the manageability controller and the secure execution environment; means for securely storing the shared secret key by the manageability controller in response to securely exchanging the shared secret key; and means for securely storing the shared secret key by the secure execution environment in response to securely exchanging the shared secret key.

Example 46 includes the subject matter of any of Examples 44 and 45, and wherein the means for securely provisioning the biometric template from the manageability controller to the secure execution environment comprises means for protecting the biometric template with the shared secret key.

Example 47 includes the subject matter of any of Examples 44-46, and wherein the means for protecting the biometric template with the shared secret key comprises means for integrity protecting and privacy protecting the biometric template with the shared secret key.

Example 48 includes the subject matter of any of Examples 44-47, and wherein the means for securely storing the shared secret key by the manageability controller comprises means for storing the shared secret key in an internal storage of the manageability controller.

Example 49 includes the subject matter of any of Examples 44-48, and wherein the means for securely storing the shared secret key by the secure execution environment comprises: means for sealing the shared secret key with an identity of the secure execution environment to generate a sealed key; and means for storing the sealed key in a data storage device of the computing device.

Example 50 includes the subject matter of any of Examples 44-49, and wherein the means for securely provisioning the biometric template from the manageability controller to the secure execution environment further comprises: means for unsealing, by the secure execution environment, the sealed key with the identity of the secure execution environment to recover the shared secret key; and means for protecting the biometric template with the shared secret key in response to unsealing the sealed key.

Example 51 includes the subject matter of any of Examples 44-50, and wherein the means for mutually authenticating the manageability controller and the secure execution environment comprises means for verifying, by the manageability controller, an identity of the secure execution environment.

Example 52 includes the subject matter of any of Examples 44-51, and wherein the identity comprises a signing identity of an authority of the secure execution environment.

Example 53 includes the subject matter of any of Examples 44-52, and wherein the means for verifying the identity of the secure execution environment comprises means for verifying a certificate of the secure execution environment with a remote verification service.

Example 54 includes the subject matter of any of Examples 44-53, and wherein the means for mutually authenticating the manageability controller and the secure execution environment comprises means for verifying, by the secure execution environment, locality of the manageability controller.

Example 55 includes the subject matter of any of Examples 44-54, and wherein the means for mutually authenticating the manageability controller and the secure execution environment comprises means for verifying, by the secure execution environment, a certificate of the manageability controller with a remote verification service.

Example 56 includes the subject matter of any of Examples 44-55, and further comprising: means for loading a runtime environment of the computing device; and means for loading a component authentication enclave within the runtime environment using secure enclave support of a processor of the computing device, wherein the secure execution environment comprises the component authentication enclave; wherein the means for mutually authenticating the manageability controller and the secure execution environment comprises means for mutually authenticating the manageability controller and the component authentication enclave.

Example 57 includes the subject matter of any of Examples 44-56, and further comprising: means for loading a lightweight firmware environment during the pre-boot process; and means for loading a biometric authentication enclave within the lightweight firmware environment using the secure enclave support of the processor, wherein the secure execution environment comprises the biometric authentication enclave; wherein the means for securely provisioning the biometric template from the manageability controller to the secure execution environment comprises means for securely provisioning the biometric template from the manageability controller to the biometric authentication enclave; and wherein the means for performing the biometric authentication operation comprises means for performing the biometric authentication operation by the biometric authentication enclave.

Example 58 includes the subject matter of any of Examples 44-57, and wherein: the component authentication enclave is associated with a signing identity of an authority of the component authentication enclave; and the biometric authentication enclave is associated with the signing identity.

Example 59 includes the subject matter of any of Examples 44-58, and further comprising means for providing access to a hardware component of the computing device in response to performing the biometric authentication operation.

Example 60 includes the subject matter of any of Examples 44-59, and wherein the hardware component comprises an encrypted data storage device.

Example 61 includes the subject matter of any of Examples 44-60, and wherein the means for receiving the biometric template from the network source comprises means for receiving the biometric template by the manageability controller using an out-of-band network interface.

Example 62 includes the subject matter of any of Examples 44-61, and wherein the manageability controller comprises a co-processor of the computing device.

Example 63 includes the subject matter of any of Examples 44-62, and wherein the untrusted software comprises at least one of a pre-boot firmware environment, an operating system, and a hypervisor.

The invention claimed is:

1. A computing device for providing authentication services during a pre-boot process, the computing device comprising:
   a manageability hardware controller, wherein the manageability hardware controller comprises a template manager;
   a hardware processor; and
   one or more memory devices comprising a plurality of instructions that, when executed, cause the computing device to:
   mutually authenticate the manageability hardware controller and a secure execution environment of the computing device, wherein the secure execution environment is executed by the hardware processor and isolated from untrusted software of the computing device, and wherein the template manager of the manageability hardware controller is to receive a biometric template from a network source in response to mutual authentication of the manageability hardware controller and the secure execution environment;

request, by the secure execution environment executed by the hardware processor, the biometric template from the manageability hardware controller in response to the mutual authentication of the manageability hardware controller and the secure execution environment;

securely provision the biometric template from the manageability hardware controller to the secure execution environment in response to a request of the biometric template by the secure execution environment, wherein the biometric template is protected from the untrusted software of the computing device; and perform, by the secure execution environment executed by the hardware processor, a biometric authentication operation on a biometric input with the biometric template during the pre-boot process, wherein the biometric input is received by the secure execution environment from a biometric input device during the pre-boot process, and wherein to perform the biometric authentication operation comprises to determine whether the biometric input matches the biometric template.

2. The computing device of claim 1, wherein to mutually authenticate the manageability hardware controller and the secure execution environment comprises to:

securely exchange a shared secret key between the manageability hardware controller and the secure execution environment;

securely store the shared secret key by the manageability hardware controller in response to secure exchange of the shared secret key; and securely store the shared secret key by the secure execution environment in response to the secure exchange of the shared secret key.

3. The computing device of claim 2, wherein to securely provision the biometric template from the manageability hardware controller to the secure execution environment comprises to protect the biometric template with the shared secret key.

4. The computing device of claim 2, wherein to securely store the shared secret key by the manageability hardware controller comprises to store the shared secret key in an internal storage of the manageability hardware controller.

5. The computing device of claim 2, wherein to securely store the shared secret key by the secure execution environment comprises to:

seal the shared secret key with an identity of the secure execution environment to generate a sealed key; and store the sealed key in a data storage device of the computing device.

6. The computing device of claim 5, wherein to securely provision the biometric template from the manageability hardware controller to the secure execution environment further comprises to:

unseal, by the secure execution environment, the sealed key with the identity of the secure execution environment to recover the shared secret key; and protect the biometric template with the shared secret key in response to unsealing of the sealed key.

7. The computing device of claim 1, wherein to mutually authenticate the manageability hardware controller and the secure execution environment comprises to verify, by the manageability hardware controller, an identity of the secure execution environment.

8. The computing device of claim 1, wherein to mutually authenticate the manageability hardware controller and the secure execution environment comprises to verify, by the secure execution environment, locality of the manageability hardware controller.

9. The computing device of claim 1, wherein the one or more memory devices further comprise a plurality of instructions that, when executed, cause the computing device to:

load a runtime environment of the computing device; and load a component authentication enclave within the runtime environment with secure enclave support of the hardware processor of the computing device, wherein the secure execution environment comprises the component authentication enclave;

wherein to mutually authenticate the manageability hardware controller and the secure execution environment comprises to mutually authenticate the manageability hardware controller and the component authentication enclave.

10. The computing device of claim 9, wherein the one or more memory devices further comprise a plurality of instructions that, when executed, cause the computing device to:

load a lightweight firmware environment during the pre-boot process; and load a biometric authentication enclave within the lightweight firmware environment with the secure enclave support of the hardware processor, wherein the secure execution environment comprises the biometric authentication enclave;

wherein to securely provision the biometric template from the manageability hardware controller to the secure execution environment comprises to securely provision the biometric template from the manageability hardware controller to the biometric authentication enclave; and wherein to perform the biometric authentication operation comprises to perform the biometric authentication operation by the biometric authentication enclave.

11. The computing device of claim 10, wherein:

the component authentication enclave is associated with a signing identity of an authority of the component authentication enclave; and the biometric authentication enclave is associated with the signing identity.

12. The computing device of claim 1, wherein the the one or more memory devices further comprise a plurality of instructions that, when executed, cause the computing device to provide access to a hardware component of the computing device in response to performance of the biometric authentication operation.

13. The computing device of claim 12, wherein the hardware component comprises an encrypted data storage device.

14. A method for providing authentication services during a pre-boot process, the method comprising:

mutually authenticating, by a computing device, a manageability controller of the computing device and a secure execution environment of the computing device, wherein the secure execution environment is isolated from untrusted software of the computing device;

receiving, by the manageability controller, a biometric template from a network source in response to mutually authenticating the manageability controller and the secure execution environment;

requesting, by the secure execution environment, the biometric template from the manageability controller in response to mutually authenticating the manageability controller and the secure execution environment;

securely provisioning, by the computing device, the biometric template from the manageability controller to the secure execution environment in response to requesting the biometric template by the secure execution environment, wherein the biometric template is protected from the untrusted software of the computing device; and performing, by the computing device with the secure execution environment, a biometric authentication operation on a biometric input using the biometric template during the pre-boot process, wherein the biometric input is received by the secure execution environment from a biometric input device during the pre-boot process, wherein performing the biometric authentication operation comprises determining whether the biometric input matches the biometric template.

15. The method of claim 14, wherein mutually authenticating the manageability controller and the secure execution environment comprises:

securely exchanging a shared secret key between the manageability controller and the secure execution environment;

securely storing the shared secret key by the manageability controller in response to securely exchanging the shared secret key; and securely storing the shared secret key by the secure execution environment in response to securely exchanging the shared secret key.

16. The method of claim 15, wherein securely provisioning the biometric template from the manageability controller to the secure execution environment comprises protecting the biometric template with the shared secret key.

17. The method of claim 14, further comprising:

loading, by the computing device, a runtime environment of the computing device; and loading, by the computing device, a component authentication enclave within the runtime environment using secure enclave support of a processor of the computing device, wherein the secure execution environment comprises the component authentication enclave;

wherein mutually authenticating the manageability controller and the secure execution environment comprises mutually authenticating the manageability controller and the component authentication enclave.

18. The method of claim 17, further comprising:

loading, by the computing device, a lightweight firmware environment during the pre-boot process; and loading, by the computing device, a biometric authentication enclave within the lightweight firmware environment using the secure enclave support of the processor, wherein the secure execution environment comprises the biometric authentication enclave;

wherein securely provisioning the biometric template from the manageability controller to the secure execution environment comprises securely provisioning the biometric template from the manageability controller to the biometric authentication enclave; and wherein performing the biometric authentication operation comprises performing the biometric authentication operation by the biometric authentication enclave.

19. The method of claim 18, wherein:

the component authentication enclave is associated with a signing identity of an authority of the component authentication enclave; and the biometric authentication enclave is associated with the signing identity.

20. One or more non-transitory, computer-readable storage media comprising a plurality of instructions stored thereon that, in response to being executed, cause a computing device to:

mutually authenticate a manageability controller of the computing device and a secure execution environment of the computing device, wherein the secure execution environment is isolated from untrusted software of the computing device;

receive, by the manageability controller, a biometric template from a network source in response to mutually authenticating the manageability controller and the secure execution environment;

request, by the secure execution environment, the biometric template from the manageability controller in response to mutually authenticating the manageability controller and the secure execution environment;

securely provision the biometric template from the manageability controller to the secure execution environment in response to requesting the biometric template by the secure execution environment, wherein the biometric template is protected from the untrusted software of the computing device; and perform, with the secure execution environment, a biometric authentication operation on a biometric input using the biometric template during the pre-boot process, wherein the biometric input is received by the secure execution environment from a biometric input device during the pre-boot process, and wherein to perform the biometric authentication operation comprises to determine whether the biometric input matches the biometric template.

21. The one or more non-transitory, computer-readable storage media of claim 20, wherein to mutually authenticate the manageability controller and the secure execution environment comprises to:

securely exchange a shared secret key between the manageability controller and the secure execution environment;

securely store the shared secret key by the manageability controller in response to securely exchanging the shared secret key; and securely store the shared secret key by the secure execution environment in response to securely exchanging the shared secret key.

22. The one or more non-transitory, computer-readable storage media of claim 21, wherein to securely provision the biometric template from the manageability controller to the secure execution environment comprises to protect the biometric template with the shared secret key.

23. The one or more non-transitory, computer-readable storage media of claim 20, further comprising a plurality of instructions stored thereon that, in response to being executed, cause the computing device to:

load a runtime environment of the computing device; and load a component authentication enclave within the runtime environment using secure enclave support of a processor of the computing device, wherein the secure execution environment comprises the component authentication enclave;

wherein to mutually authenticate the manageability controller and the secure execution environment comprises to mutually authenticate the manageability controller and the component authentication enclave.

24. The one or more non-transitory, computer-readable storage media of claim 23, further comprising a plurality of instructions stored thereon that, in response to being executed, cause the computing device to:
    load a lightweight firmware environment during the pre-boot process; and
    load a biometric authentication enclave within the lightweight firmware environment using the secure enclave support of the processor, wherein the secure execution environment comprises the biometric authentication enclave;
    wherein to securely provision the biometric template from the manageability controller to the secure execution environment comprises to securely provision the biometric template from the manageability controller to the biometric authentication enclave; and
    wherein to perform the biometric authentication operation comprises to perform the biometric authentication operation by the biometric authentication enclave.

25. The one or more non-transitory, computer-readable storage media of claim 24, wherein:
    the component authentication enclave is associated with a signing identity of an authority of the component authentication enclave; and
    the biometric authentication enclave is associated with the signing identity.

* * * * *